United States Patent
Janker et al.

(10) Patent No.: US 8,063,539 B2
(45) Date of Patent: Nov. 22, 2011

(54) ELECTROSTRICTIVE DRIVE

(75) Inventors: Peter Janker, Riemerling (DE); Alois Wagner, Dietramszell (DE)

(73) Assignee: Eurocopter Deutschland GmbH, Donauworth (DE)

( * ) Notice: Subject to any disclaimer, the term of this patent is extended or adjusted under 35 U.S.C. 154(b) by 0 days.

(21) Appl. No.: 13/041,691

(22) Filed: Mar. 7, 2011

(65) Prior Publication Data

US 2011/0148254 A1 Jun. 23, 2011

Related U.S. Application Data

(62) Division of application No. 12/515,330, filed on Jul. 20, 2009.

(30) Foreign Application Priority Data

Nov. 20, 2006 (DE) .......................... 10 2006 054 869

(51) Int. Cl.
*H01L 41/08* (2006.01)
(52) U.S. Cl. ........................ 310/328; 367/158; 367/165
(58) Field of Classification Search ................... 310/328; 367/158–165
See application file for complete search history.

(56) References Cited

U.S. PATENT DOCUMENTS

| | | | |
|---|---|---|---|
| 4,845,687 A * | 7/1989 | Bromfield | 367/158 |
| 4,845,688 A | 7/1989 | Butler | |
| 4,964,106 A * | 10/1990 | Bromfield | 367/165 |
| 5,085,928 A * | 2/1992 | Krueger | 428/474.4 |
| 5,345,428 A * | 9/1994 | Arnold et al. | 367/165 |
| 6,050,808 A | 4/2000 | Schloss | |
| 6,294,859 B1 | 9/2001 | Jaenker | |
| 6,927,528 B2 | 8/2005 | Barillot et al. | |
| 6,963,157 B2 * | 11/2005 | Sato et al. | 310/367 |
| 2002/0062546 A1 | 5/2002 | Obeshaw | |

FOREIGN PATENT DOCUMENTS

| | | |
|---|---|---|
| DE | 197 25 291 | 12/1996 |
| DE | 196 44 161 | 5/1997 |
| DE | 197 39 594 | 3/1999 |
| DE | 10 2004 002 249 | 7/2004 |
| EP | 0 270 955 | 6/1998 |
| EP | 1 035 015 | 9/2000 |
| JP | 6-238758 | 8/1944 |
| JP | 58205730 A * | 11/1983 |
| JP | 63-47129 | 2/1988 |
| JP | 4-126231 | 4/1992 |

OTHER PUBLICATIONS

International Search Report dated Apr. 11, 2008 from corresponding PCT application No. PCT/DE2007/001997.

* cited by examiner

*Primary Examiner* — Jaydi San Martin
(74) *Attorney, Agent, or Firm* — Brooks Kushman P.C.

(57) ABSTRACT

An apparatus for producing a holding or transmission frame (12, 20) for an electrostrictive actuator, in particular, a stacked piezoactuator (5) includes the following steps: a) a winding spindle (52), corresponding to the shape of the inner periphery of the frame (12, 20), is wound with several layers of a unidirectional prepreg for forming a laminate body; b) the laminate body is hardened; c) the hardened laminate body in the frame is cut by sections parallel to the direction of winding. An electrostrictive drive (100) includes an electrostrictive actuator (5) in which the length varies during actuation, and a transmission frame (12) that surrounds the actuator, is connected to the actuator for initiating the variation in length of the actuator and for amplifying the actuator, the transmission frame (12) being made of a prepreg that is wound in the laminate body and hardened.

9 Claims, 3 Drawing Sheets and traversing frame.

ELECTROSTRICTIVE DRIVE

CROSS REFERENCE TO RELATED APPLICATIONS

This application is a divisional of U.S. application Ser. No. 12/515,330, filed Jul. 20, 2009 which is the U.S. National Phase of PCT/DE2007/001997 filed Nov. 7, 2007 which claims priority to German Application No. 10 2006 054869.8 filed Nov. 20, 2006.

BACKGROUND OF THE INVENTION (1) Field of the Invention

The invention relates to an apparatus for producing a holding and/or traversing frame for a stacked piezoactuator that contributes to increasing the piezopath. Moreover, the invention relates to an electrostrictive drive with such a holding and/or traversing frame.

(2) Description of Related Art

For activation of flaps in, for example, a helicopter rotor or other applications in aviation, piezoactuators or electrostrictive actuators are known to be used. In particular, stacked piezoactuators that are also called piezostacks are used that expand when an electrical voltage is applied and thus make available an adjustment path. Since, however, in, for example, a stacked piezoactuator with a length of 100 mm the possible expansion, i.e., the adjustment path, is approximately in the range of 0.1 mm, it is desirable to enlarge the piezopath by means of a traversing mechanism, for example, by a factor of 10 or the like. For this purpose, placing and clamping the electrostrictive actuator, especially the piezostack, in a traversing frame that makes available a path of the activated piezoelement that has been increased by the traversing factor in a direction perpendicular to the piezopath, i.e., perpendicular to the change in the length of the piezoelement, are known.

Such a frame that is shaped essentially octagonally is known, for example, from DE 197 39 594 A1. The frame consists of rigid, metal frame parts that are connected to one another via flexible articulation sites. There are four fixed frame parts. The articulation sites are each formed from several elastic bending elements that lie on top of one another with bending joint axes parallel to one another and on one side are connected to a fixed frame part that connects all the bending elements of the articulation site integrally to one another. The other fixed frame part that is connected to the articulation site is divided into several separate individual levers that are each connected to a bending element of the articulation site. The frame parts are made integrally solid.

DE 196 25 921 A1 discloses an arrangement in which the metallic frame parts of the above-described prior art are replaced essentially by bending-flexible tie rod parts that are, however, highly stiff in the lengthwise direction. The tie rod parts are formed from pieces of steel cable or a fiber composite laminate with a lengthwise fiber structure that is unidirectional in the lengthwise direction of the rod and are provided as necessary with reinforcing elements that increase the tensile strength on their middle regions located between the actuator pieces and output members.

Another piezoelectric actuator is known from DE 196 44 161 C2, in which there are at least two disk-shaped bending elements that are located coaxially on top of one another and that each have a carrier plate of hard elastic material with a layer of piezoelectric material applied on one or both sides. Two bending elements at a time are connected to one another via at least two bending joints located on the periphery of the carrier plates, such a bending joint having at least one bending beam and a rigid spacer piece that is essentially perpendicular to it.

So that the traversing frame can work reliably, it is necessary for the four frame legs that form such an essentially octagonal frame to have tensile stiffness and to be at the same time very flexurally soft in the joints. Moreover, it is necessary for them to tolerate continuous loads at high frequencies, for example on the order of magnitude of 30 Hz, and, moreover, to have, as much as possible, such slow damage progression in case of damage that sudden total failure cannot occur. Rather, damage that arises and leads to failure should be able to be discovered within the prescribed inspection intervals. This is especially important in safety-relevant applications, such as, for example, in applications of such an electrostrictive actuator for flap control of a helicopter rotor.

SUMMARY OF THE INVENTION

With respect to these considerations, the object of the invention is to provide a process for producing a traversing frame for an electrostrictive actuator, especially a stacked piezoactuator, which enables economical production of traversing frames that meet these requirements. Moreover, it is the object of this invention to make available an electrostrictive drive that is capable of high performance and is durable.

This object is achieved with a process for producing a holding or traversing frame for an electrostrictive actuator, especially a stacked piezoactuator.

The idea of the invention is to make a holding or traversing frame in one piece from a wound fiber composite material, especially by winding a prepreg with unidirectional fibers in the lengthwise direction of a belt, preferably with unidirectional lengthwise fibers around a winding core and in a plane parallel to the winding direction by cutting the cured body that has been formed into individual holding or traversing frames with a predefined width. The fiber direction corresponds preferably to the winding direction or peripheral direction of the holding or traversing frame.

The use of prepregs, i.e., layers with fibers that are already impregnated with resin (pre-impregnated), makes it possible to produce frames of high tensile strength, especially when the prepreg fibers are fibers with a very high modulus of elasticity, such as, for example, the carbon fibers called M40J. This yields a modulus of elasticity of the finished laminate, i.e., of the cured frame, which is comparable to steel and is, for example, in the range of roughly 210,000 N/mm².

Preferably, a plurality of layers, for example roughly fifty layers, are wound.

The use of a winding process for producing the holding or traversing frame, moreover, allows economical production, since several holding or traversing frames can be quickly and economically produced by a simple winding process, curing and subsequent cutting, while complex mounting steps for assembling the frame can be eliminated.

The use of a large number of prepreg layers at the same time compared to conventional metal frames, especially steel frames, greatly reduces the tensile stresses in the frame by roughly a factor of 1/7. At the same time, existing bending stresses are reduced by a factor of 1/13. Moreover, the material strength increases overall; this leads to the traversing frame having a very long service life and, moreover, becoming damage-tolerant. In particular, this means that as a result of the different prepreg layers, in the event of a failure of one of the layers, it can be assumed that the other layers are not adversely affected at the same time and thus all individual layers would have to break or tear in order to result in complete failure of the actuator or of the holding or traversing frame. Thus, the holding or traversing frame for a stacked piezoactuator produced in a winding process is also advantageous with respect to safety requirements, for example in aviation, in which slow damage progression is critical in order to ensure with certainty—for maintenance intervals that are as long as possible—that there is a maintenance instant between the initial damage detection possibility and subsequent failure and thus the damage can be reliably recognized before final failure.

Due to the fact that a traversing frame produced from composite material is, moreover, very light, especially much lighter than a steel frame, it is possible to provide, for example, a larger number of piezoelements at a total weight of the electrostrictive actuator that has been kept the same; this in turn leads to an increase in the power of the actuator, i.e., greater deflection.

Advantageously, in the winding process, several individual cut pieces of the prepreg are wound around the winding mandrel, the respective junctions between the cut pieces being offset between the individual layers in the peripheral direction. It is preferably not a continuous belt, but rather individual cut pieces of the belt whose length corresponds, for example, to the peripheral length of the holding or traversing frame. The offset of the junctions contributes to avoiding weak spots in the holding or traversing frame and rather to the frame being uniformly loadable due to the distribution of junctions along the periphery of the holding or traversing frame.

The winding mandrel has a shape that corresponds to the desired peripheral outline of the finished frame, for example a shape similar to an octagon. Here, in the winding process, the individual layers are oriented preferably using positioning stops on the winding mandrel. This makes it possible to refer later in use to individual junctions and to label them. In particular, the junctions are defined within the finished holding or traversing frame.

According to one especially preferred embodiment, on the holding or traversing frame along the peripheral direction, there are zones with low bending stiffness and zones with high bending stiffness. The zones with low bending stiffness are achieved by individual layers of the prepreg material being replaced by layers of separating film in winding in these zones. These zones with separating film, in which, for example, every other layer is a layer with separating film, have—compared to a compact laminate—a flexural stiffness that is reduced by a factor of $1/7000$. This applies especially when, for example, a 0.025 mm thick TEDLAR® (polyvinyl fluoride (PVF)) film is used between a thin, unidirectional CFK (carbon-fiber-reinforced plastic) prepreg with a layer thickness of, for example, 0.14 mm. In the zones without separating film along the periphery, prepreg layers that equalize the film thickness are placed in the layers in which separating film is placed in the zones with separating film. Thus, it is possible, for the bending joints of the traversing frame or holding frame, to provide fewer flexurally stiff arrangements and thus to ensure extreme flexural softness, combined with very high tensile strength in a homogeneous body.

To make the production process more efficient, for example, a 300 mm long winding laminate body is produced that is cut into 19 mm wide strips.

When the traversing frame for an electrostrictive drive, especially in conjunction with an electrostrictive actuator in the form of a stacked piezoactuator, is used, it is preferred that surrounding the traversing frame along the periphery there is an additional holding frame, preferably produced from a winding body of prepreg layers with unidirectional fibers. With this holding frame, the traversing frame can be cemented to less deformable sites that correspond to flexurally stiff zones in which preferably no film has preferably been placed in the traversing frame, and in addition, a holding flange can be cemented or placed in the holding frame on one of the ends in the lengthwise direction of the traversing frame between the traversing frame and the holding frame, and the traversing frame is attached, for example, in the rotor blade with the holding flange. Cementing along regions of the periphery between the traversing frame and the holding frame ensures a reliable connection and uniform traversal of the piezopath or the path of the electrostrictive actuator.

For connecting the stacked piezoactuator or the electrostrictive actuator to the traversing frame, preferably on the lengthwise ends of the traversing frame, force application elements are placed in the latter and are attached, for example cemented there. The force application elements are preferably made of metal and are essentially U-shaped or semicircular so that they correspond to the inside periphery of the traversing frame on the lengthwise ends. When such force application elements are cemented at opposite positions into the traversing frame so that they form an uppermost and a lowermost terminal element along the stack direction of the stacked piezoactuator, the change in the length of the piezoelement can be easily transferred to the traversing frame.

BRIEF DESCRIPTION OF THE DRAWINGS

The invention is described below using the attached figures, in which.

DETAILED DESCRIPTION OF THE PREFERRED EMBODIMENT

FIGS. 1 to 5 show one embodiment of an electrostrictive drive 100 (FIG. 5) with a frame arrangement 10 that contains a traversing frame 12 and a holding frame 20 according to the invention.

Figure 1:
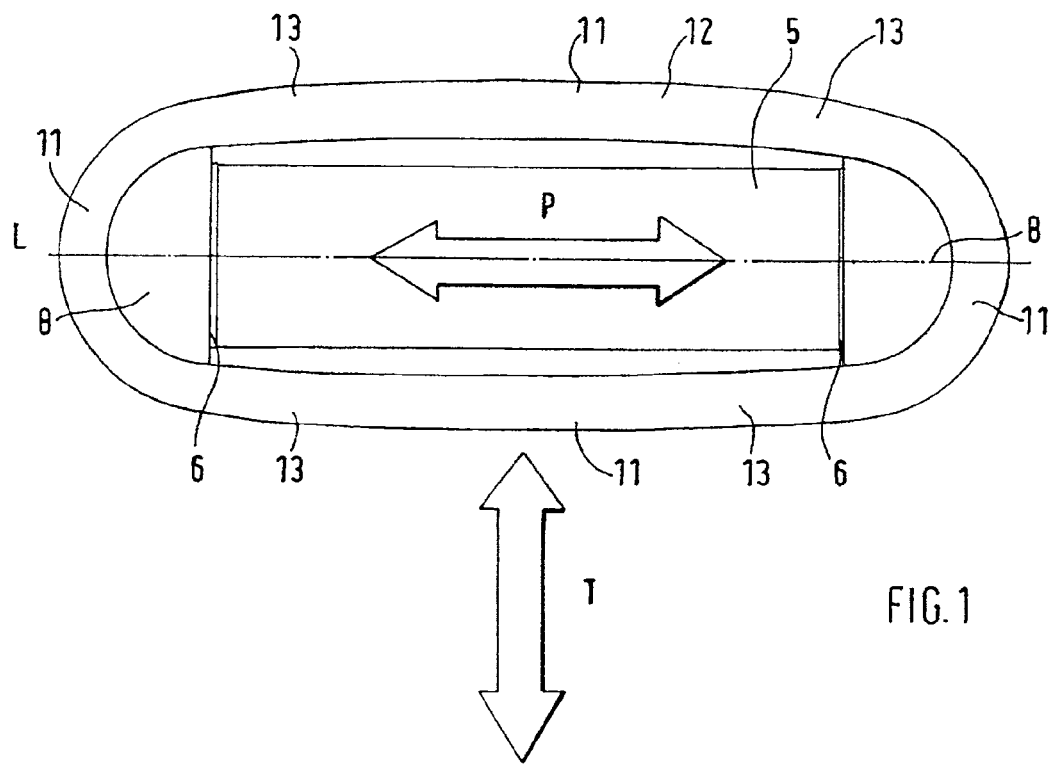
FIG. 1 schematically shows a top view of an electrostrictive actuator without the holding frame.

FIG. 1 schematically shows the manner of operation of an electrostrictive drive with a traversing frame 12. In particular, there is an electrostrictive actuator that is formed as a stacked piezoactuator 5. When a voltage is applied from a voltage source that is not shown, the stacked piezoactuator 5 produces a change in length in itself that is shown in FIG. 1 as the piezopath P. The stacked piezoactuator 5 in its stack direction on its two stack ends is connected by way of suitable connecting means, for example cement layers 6, to force application elements 8 that for their part are in turn connected to the traversing frame 12. The force application elements 8 are cemented into the traversing frame 12, for example, and are made of metal in order to provide stable application of force and to hold the stacked piezoactuator 5.

The force application elements 8 are provided on both sides as the termination of the stacked piezoactuator 5 in its stacking direction that corresponds to the direction of the change in length of the stacked piezoactuator 5, and are essentially U-shaped in the top view shown in FIG. 1 with a closed inner surface. Their outer peripheral shape on the surface that is in contact with the traversing frame 12 corresponds essentially to the inner peripheral shape of the traversing frame 12, especially on its lengthwise ends.

In this case, the lengthwise direction is the direction in which the piezopath arises, i.e., the stack direction of the stacked piezoactuator 5 or the direction of change in length of a generally electrostrictive actuator. The traversing frame 12 is essentially octagonal in the top view shown in FIG. 1 or rhombic with flattened corners. The stack direction of the piezoactuator corresponds to the longer of the two diagonals of the rhombus and is the lengthwise direction L.

The arrangement consisting of the stacked piezoactuator 5, the force application elements 8 and the traversing frame 12 that is shown in FIG. 1 is symmetrical both with respect to the lengthwise axis L and also with respect to an axis that runs perpendicular to it in the plane of the drawings. The traversing frame 12 can be flexibly deformed.

The octagonal configuration of the traversing frame 12 on the ends in the lengthwise direction L and the middle sections between the lengthwise ends (corresponding to the corners of the rhombus) has comparatively rigid coupling regions 11 and 12 in each case, while the zones 13 of the traversing frame 12 that lie in between are made as comparatively flexurally soft zones.

When the length of the stacked piezoactuator 5 changes along the piezopath P, for example in expansion under an electrical voltage, the traversing frame 12 follows the deformation accordingly, by its fixed connection on the force application elements 8 to the stacked piezoactuator 5 and by flexural softness by means of the zones 13, and its geometrical shape, traversal, especially an enlargement, of the piezopath P, arises, for example by a factor of 10. Accordingly, the piezopath P that has been enlarged by a factor of 10 can be tapped along the deflection T. For example, for a stacked piezoactuator with a length of roughly 100 mm that has a typical expansion of 0.1 mm when an electrical voltage is applied, a path of 1 mm for a transfer ratio of 1:10 along the enlarged path T of the traversing frame can be tapped.

In addition to flexural softness through zones 13, it is important for the traversing frame 12 that it has legs with tensile stiffness that correspond to zones 13.

Figure 3:
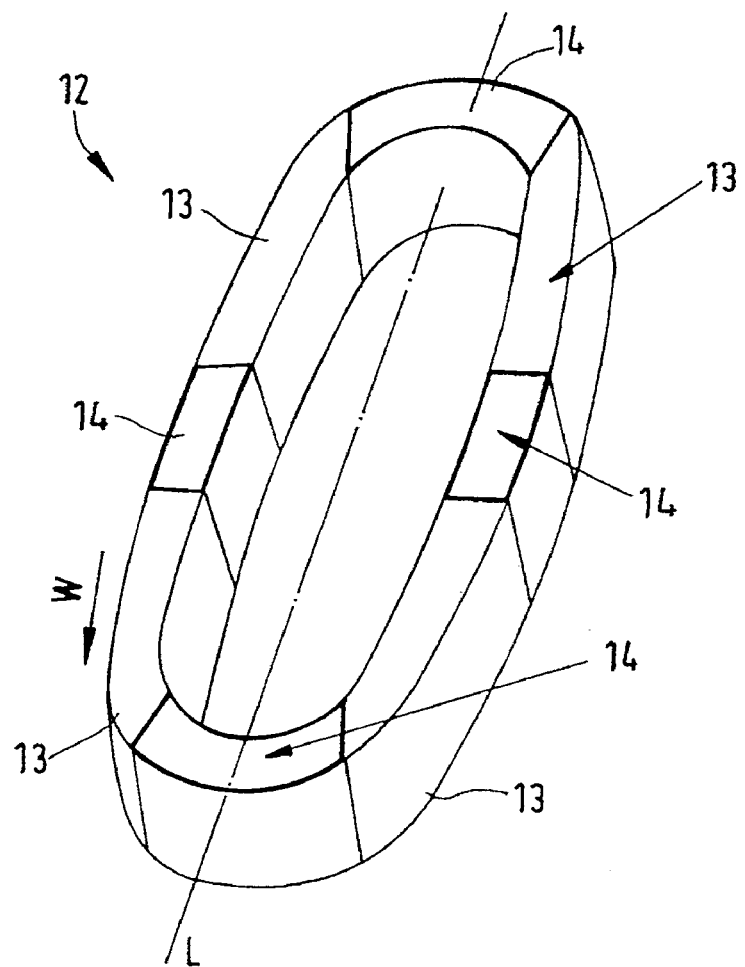
FIG. 3 schematically shows the traversing frame.

FIG. 3 shows the traversing frame 12 in more detail. The traversing frame 12 is formed altogether from a fiber composite in a winding process. For this purpose, several layers of a prepreg along the winding direction W that is shown in FIG. 12 and that corresponds essentially to the peripheral direction of the traversing frame 12 are laminated. The traversing frame 12 that is shown in FIG. 3 is preferably formed from several individual cut pieces of the prepreg that are placed on top of one another and have interfaces offset between two layers along the peripheral direction or winding direction W.

As is schematically indicated in FIG. 3, along the peripheral direction, the traversing frame 12 contains zones 13 with elevated flexural softness and zones 14 that are comparatively rigid. These zones 14 correspond to the coupling sites 11 in their position.

The flexurally soft zones 13 acquire their high flexural softness compared to zones 14 by a separating film being placed between individual layers of the fiber composite prepreg when the frame 12 is being wound. The separating film is, for example, a 0.025 mm thick TEDLAR® (polyvinyl fluoride) film. The film contributes to the individual layers of the prepreg being connected less tightly to one another and being able to move more easily against one another, which contributes to the deformation capacity in the zone 13. For example, one separating film layer at a time can be placed between two layers of prepreg in zone 13, i.e., separating film layers and prepreg layers alternate along the lamination direction of the winding body that shapes the traversing frame 12.

In zones 14, conversely, there is no separating film. In other words, in zones 14 without separating film, there is a pure body laminated from prepreg in which the layer thickness that arises by insertion of separating films between the prepreg layers in zones 13 can be equalized by additional prepreg layers, so that the traversing frame 12 has an essentially constant thickness or one that passes uniformly into one another. As is shown in FIG. 3, the zones 14 of compact laminate are located both on the two ends in the lengthwise direction of the traversing frame 12 and also at the coupling sites of the legs between the two end zones 14 of pure laminate, and four zones 13 are provided with separating film in alternation therewith around the periphery of the traversing frame 12. Preferably, the transitions between the separating film and the laminate, i.e., between zones 13 and 14, are made such that they are likewise offset with respect to the individual layers to one another somewhat in the peripheral direction so that a theoretical failure site cannot arise due to repeated transitions at a certain site along the peripheral direction of the traversing body 12.

When a preimpregnated layer with high modulus carbon fibers M40J is selected as a prepreg, and, for example, 52 layers are wound to form a traversing frame 12, and between two layers of prepreg at a time in zones 13 a layer of separating film is placed, the film in sum has a total thickness of roughly 1.2-1.3 mm, which can be equalized by several layers of the prepreg, of which one layer is, for example, 0.14 mm thick. The zones 14 without the separating film compared to zones 13 with the separating film have increased flexural stiffness that is increased by a factor of 7000 for the aforementioned parameters.

The selected prepreg is preferably a unidirectional CFK prepreg, in which preferably the aforementioned high modulus carbon fibers are used, and in each case, the fibers should be oriented along the winding direction W to ensure optimum tensile stiffness.

To attach the traversing frame with the force application elements 8 that are mounted in it and that are shown in FIG. 1, and the electrostrictive actuator in the form of a stacked piezoactuator 5, for example to a helicopter rotor blade, it is necessary for the attachment to be dimensioned such that, on the one hand, it allows high-frequency deformations of the traversing frame and, on the other hand, absorbs or tolerates the forces that arise in the rotor blade, i.e., for example a centrifugal acceleration of 800 g that acts on the actuator (corresponding to a centrifugal force of 4700 N).

Figure 2:
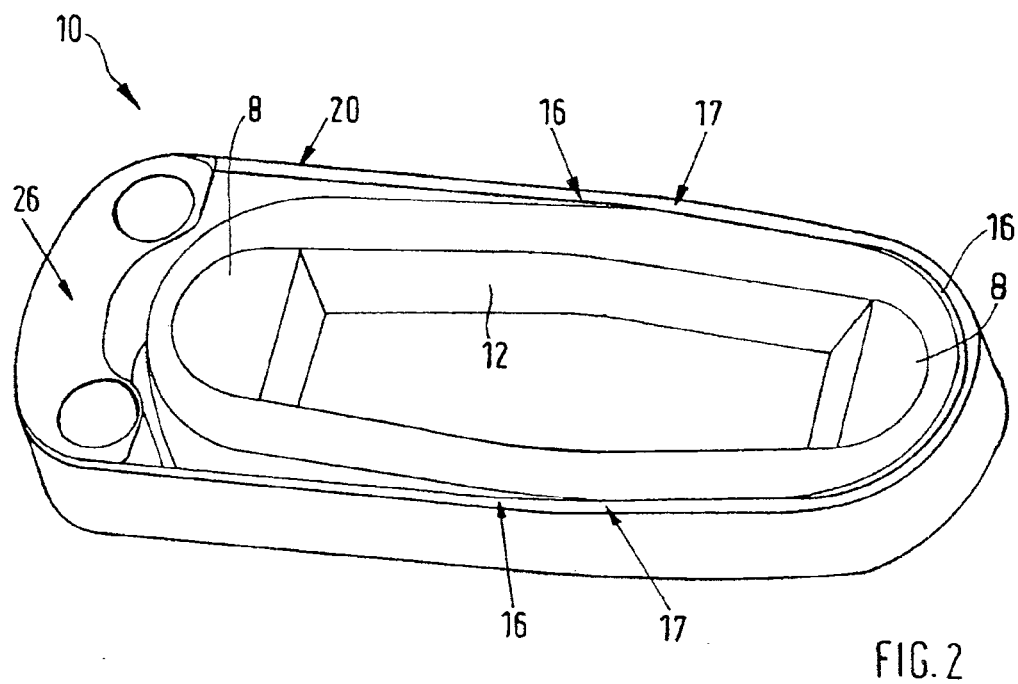
FIG. 2 shows a perspective view of an electrostrictive actuator with a holding frame.

For this purpose, as shown in FIG. 2, the traversing frame 12 is placed in a holding frame 20 that is provided with a holding flange 26.

Figure 4:
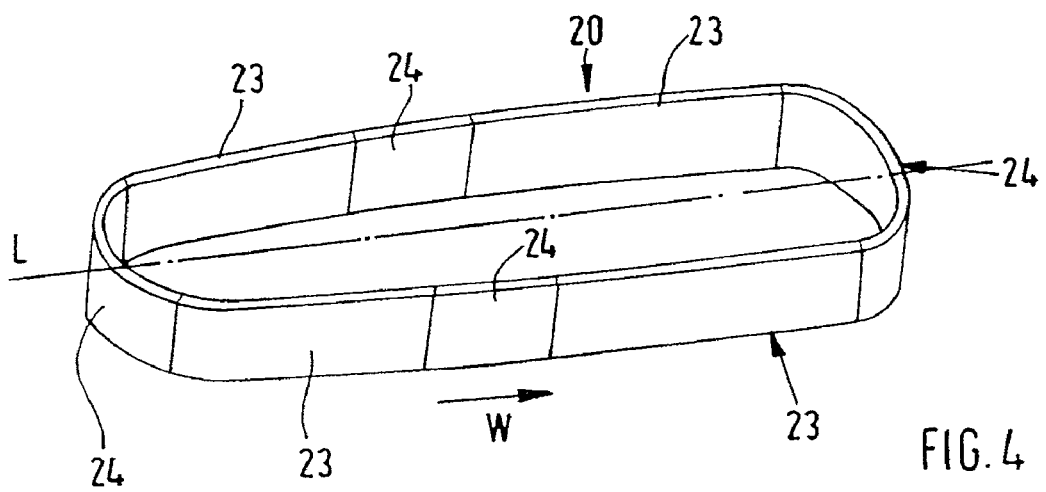
FIG. 4 schematically shows a holding frame.

The holding frame 20, as is shown in FIG. 4, is likewise produced preferably from a winding body of a fiber composite material, however differently from the traversing frame 12 its being only symmetrical to the lengthwise axis L, but as a result of providing the holding flange 26 (FIG. 2) that is placed between one lengthwise end of the traversing frame 12 and the holding frame 20 its not having axial symmetry with respect to one axis perpendicular to the lengthwise axis of the holding frame. The holding frame 20 is also formed in the same manner as the traversing frame 12 with zones with separating film 23 and zones without separating film 24 that alternate in the peripheral direction that corresponds to the winding direction W of the holding frame 20. To attach the traversing frame 12 to the holding frame 20, the latter are cemented against one another by cement sites 16 (see FIG. 2) that are provided essentially along the respective zones 14, 24 without separating film, with the exception that in one of the lengthwise-side ends of the holding frame 20, i.e., in one of the two end-side zones 24 without a separating film, instead of a connection to the traversing frame 12, the holding flange 26 is cemented in or attached there. Between the cement sites 16 along the zones 13 and 23 with separating film—along the regions 17—the holding frame 20 and traversing frame 12 are not connected to one another.

Figure 5:
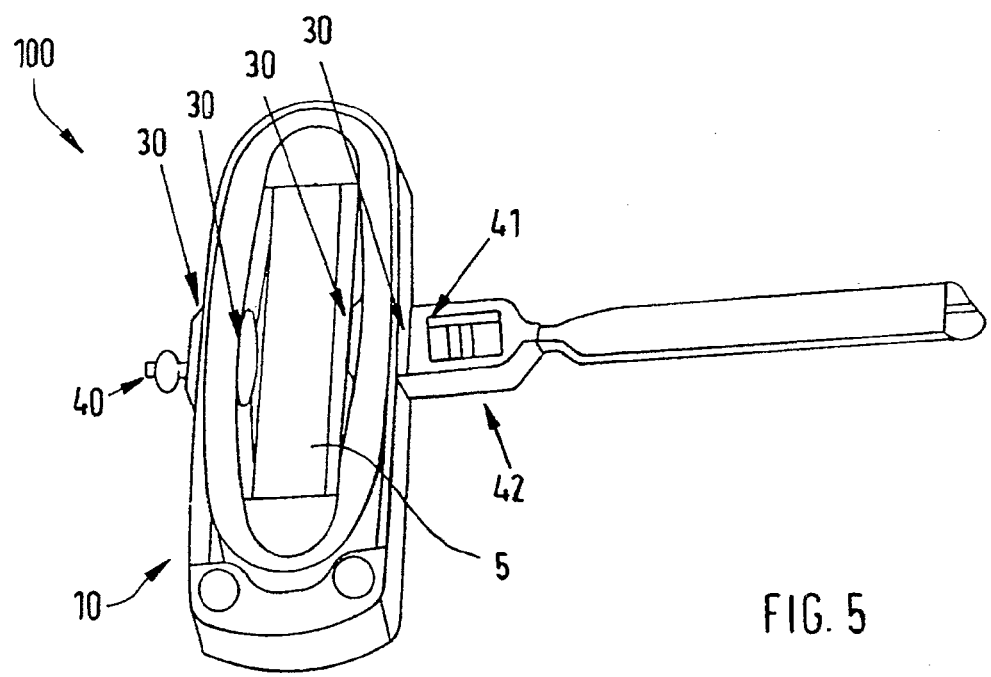
FIG. 5 shows a perspective view of the electrostrictive drive for attachment in, for example, a rotor blade of a helicopter.

The arrangement 10 that is shown in FIG. 2 and that corresponds essentially to the electrostrictive drive 100, the stacked piezoactuator 5, however, not being shown in FIG. 2, is finally provided with holes on one housing side and the drive side for attachment (see FIG. 5). For this reason, in the coupling zones 11 along the long sides of the traversing frame 12 or holding frame 20 in the regions 14 without separating film, there are through holes that in addition to preventing cracks or breaks in the zone of the holes are reinforced by additional fabric reinforcing layers 30 being cemented on the outside to the holding frame and on the inside in the traversing frame. These layers additionally prevent damage of the electrostrictive drive 100 in the region of the holes under operating loads. A dowel screw 40 is placed in the intended hole for housing-side attachment. For attachment of the measurement frame 42 on the drive side, a sleeve 41 is routed into the hole through the traversing frame 12 and the holding frame 20.

Figure 6:
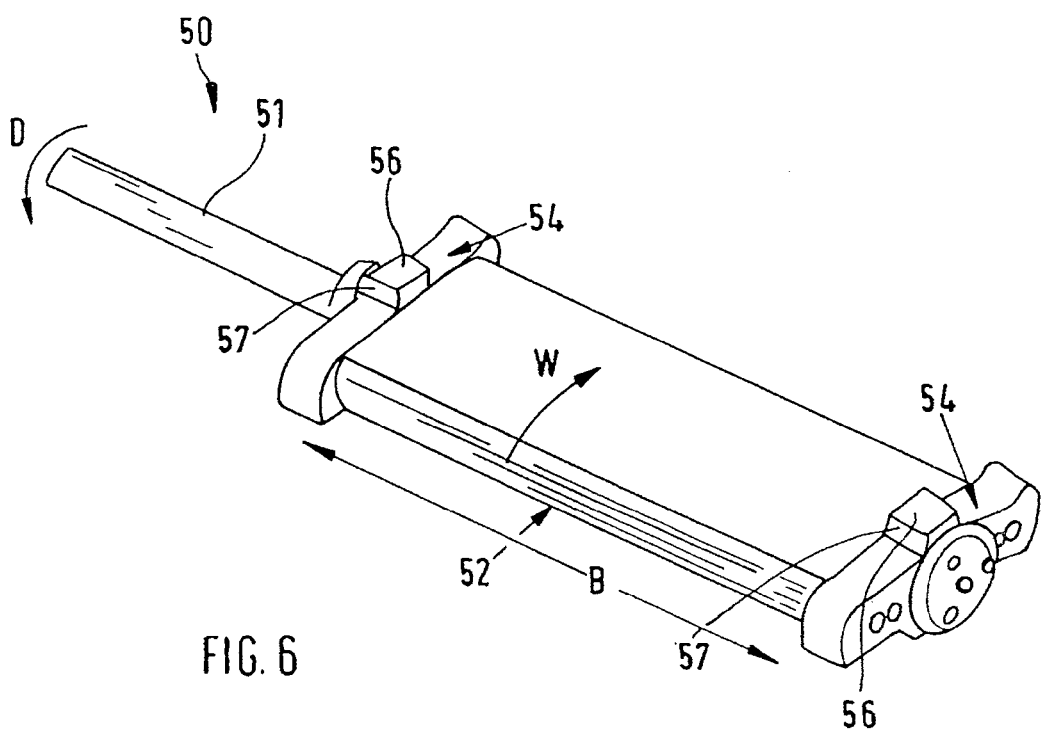
FIG. 6 shows a winding mandrel for producing the holding and/or traversing frame.

FIG. 6 finally shows a winding mandrel 50 that can be used to produce the traversing frame 12. The winding mandrel for the holding frame is not shown and is made similarly, but as a result of the aforementioned asymmetry of the holding frame 20, it is likewise made asymmetrical. The winding mandrel 50 contains a mounting shaft 51 with which it can be clamped, for example, in a turning device. The direction of rotation of the mounting shaft 51 in the turning device is shown schematically by the arrow D. The winding mandrel 50 has a width B between the end plates 54 into which the prepreg can be wound, which is, for example, 300 mm, i.e., a multiple of the end width of the holding frame 20 or traversing frame 12. Thus, by a single winding process, several holding and traversing frames 20 and 12 can be produced that—after the laminate is cured—are cut into pieces of the corresponding width, for example 19 mm.

The end plates 54 of the winding mandrel 50 are additionally provided with positioning stops 56 for strips of film. Thus, for example, the strips of film can be placed over a greater width (including the width of the end plates), while the prepreg layers lie only within the zone between the two end plates 54.

Thus, reliable positioning of the film layers can be ensured. When the positioning stops 56 have, for example, beveled side surfaces 57, film layers lying on top of one another are slightly offset to one another along the winding direction so that there is no abrupt transition between the zones 13 with separating film and zones 14 without separating film in, for example, the traversing frame.

REFERENCE NUMBER LIST 5 piezoactuator
6 cement layer
8 force application element
10 frame arrangement
11 coupling region
12 traversing frame
13 zone
14 zone
16 cementing site
17 region
20 holding frame
23 separating film
24 separating film
26 holding flange
30 fabric reinforcing layer
40 dowel screw
41 sleeve
42 measurement frame
50 winding mandrel
51 mounting shaft
52 winding mandrel
54 end plate
56 positioning stop
57 side surface
100 electrostrictive drive
B width
D direction of rotation
L lengthwise axis
P piezopath
W angle direction

What is claimed is:

1. An electrostrictive drive with an electrostrictive actuator that changes length upon activation, and a traversing frame that surrounds the actuator, the traversing frame being connected to the actuator for applying the change of length of the actuator and that amplifies the change in length of the actuator, the traversing frame being formed from a laminate body composed of wound and cured prepreg, wherein surrounding the traversing frame is a holding frame formed from a laminate body of wound and cured prepreg; and
   wherein the laminate body of at least one of the traversing frame and the holding frame is formed from several individual cut pieces of the prepreg that are wound around a winding mandrel, junctions between the cut pieces being offset between the layers in the peripheral direction of the laminate body.

2. An electrostrictive drive according to claim 1, wherein the holding frame is cemented to the traversing frame along regions of their peripheries.

3. An electrostrictive drive according to claim 1, wherein in the peripheral direction along at least one of the traversing frame and the holding frame, there are zones with separating film and zones without separating film that are formed by alternating arrangement of cut pieces of the prepreg and cut pieces of a separating film along the peripheral direction of the laminate body in defined layers.

4. An electrostrictive drive according to claim 3, wherein in zones with separating film, a layer of prepreg and a layer of separating film are provided in alternation in the direction of the layer.

5. An electrostrictive drive according to claim 3, wherein the film is a TEDLAR® (polyvinyl fluoride) film.

6. An electrostrictive drive according to claim 3, wherein at least one of the traversing frame and the holding frame is formed from a CFK prepreg, especially a prepreg with a carbon fiber M40J.

7. An electrostrictive drive according to claim 1, wherein the electrostrictive actuator is a stacked piezoactuator.

8. An electrostrictive drive according to claim 1, wherein metallic force application elements are attached to the traversing frame, the metallic force application elements being attached to and actable on the electrostrictive actuator.

9. An electrostrictive drive according to claim 8, wherein the metallic force application elements in positions opposite one another are cemented into the traversing frame, preferably along the stacking direction on the two end sides of a stacked piezoactuator.

* * * * *